US006462287B1

United States Patent
Mikesell (10) Patent No.: US 6,462,287 B1
(45) Date of Patent: Oct. 8, 2002

(54) SCALE WEIGHT COMBINATION SELECTION SYSTEM

(75) Inventor: Karl A. Mikesell, Elgin, IL (US)

(73) Assignee: Multisymmetric Incorporated, Elgin, IL (US)

( * ) Notice: Subject to any disclaimer, the term of this patent is extended or adjusted under 35 U.S.C. 154(b) by 0 days.

(21) Appl. No.: 09/422,699

(22) Filed: Oct. 21, 1999

(51) Int. Cl.[7] ............................................. G01G 19/387
(52) U.S. Cl. .................................................. 177/25.18
(58) Field of Search ............................. 177/25.18, 164

(56) References Cited

U.S. PATENT DOCUMENTS

| 4,466,500 A | * | 8/1984 | Mosher et al. | 177/25.18 |
| 4,666,002 A | * | 5/1987 | Haze | 177/25.18 |
| 4,678,046 A | * | 7/1987 | Mosher | 177/25.18 |
| 4,727,947 A | * | 3/1988 | Naito | 177/164 |

FOREIGN PATENT DOCUMENTS

| EP | 000282743 | * | 9/1983 | 177/25.18 |
| GB | 2112597 | * | 7/1983 | 177/25.18 |

OTHER PUBLICATIONS

Charles W. renolds, "Program Design and Data Structures in Pascal", Wadsworth Publishing Company, Belmont, California, pp. 101–107, 122–129. Copyright 1986.*

* cited by examiner

Primary Examiner—Randy W. Gibson
(74) Attorney, Agent, or Firm—Dillis V. Allen, Esq.

(57) ABSTRACT

A scale weight combination selection system for selecting the most appropriate combination of scale weights for combinational weight machines. The system is best utilized in higher number order of scale machines and includes date stamping the scale weights as the scales are loaded, dividing the scale weights into two groups, one the earlier date stamps, and the other the later date stamps, calculating all combinations of scale weights in each group, assigning a digital code to each combination with code position representing scale number, ranking and sorting the digital codes in each group by a formula giving preference to the earliest date scale weights and the greatest number of scales in the combinations, adding the combinations, sequentially adding the combinations in one group to the combinations in the other groups in the ranked order, and selecting from the resulting combinations, the best combination of scale weights closest to a target weight.

24 Claims, 7 Drawing Sheets

| 16a \ 16b | | 8929 | 7822 | 7754 | 6647 | 7027 | 5920 | 5852 | 4745 | 6446 | 5339 | 5271 | 4164 | 4544 | 3437 |
|---|---|---|---|---|---|---|---|---|---|---|---|---|---|---|---|
| | | $R_1$ | $R_2$ | $R_3$ | $R_4$ | $R_5$ | $R_6$ | $R_7$ | $R_8$ | $R_9$ | $R_{10}$ | $R_{11}$ | $R_{12}$ | $R_{13}$ | $R_{14}$ |
| | | 11111 | 01111 | 10111 | 00111 | 11011 | 01011 | 10011 | 00011 | 11101 | 01101 | 10101 | 00101 | 11001 | 01001 |
| 10771 | $R_1$ 11111 | 19700 | 18593 | 18525 | 17418 | 17798 | 16691 | 16623 | 15516 | 17217 | 16110 | 16042 | 14935 | 15315 | 14208 |
| 8619 | $R_2$ 01111 | 17548 | 16441 | 16373 | 15266 | 15646 | 14539 | 14471 | 13364 | 15065 | 13958 | 13890 | 12783 | 13163 | 12056 |
| 8303 | $R_3$ 10111 | 17232 33 | 16057 | 14950 | 15330 | 14223 | 14155 | 13048 | 14749 | 13642 | 13574 | 12467 | 12847 | 11740 |
| 6151 | $R_4$ 00111 | 34 | | 13905 | 12798 | 13178 | 12071 | 12003 | 10896 | 12597 | 11490 | 11422 | 10315 | 10695 | 9588 |
| 9621 | $R_5$ 11011 | | 17443 | 17375 | 16268 | 16648 | 15541 | 15473 | 14366 | 16067 | 14960 | 14892 | 13785 | 14165 | 13058 |
| 7469 | $R_6$ 01011 | 16398 | 15291 | 15223 | 14116 | 14496 | 13389 | 13321 | 12214 | 13915 | 12808 | 12740 | 11633 | 12013 | 10906 |
| 7153 | $R_7$ 10011 | 16082 | 14975 | 14907 | 13800 | 14180 | 13073 | 13005 | 11898 | 13599 | 12492 | 12424 | 11317 | 11697 | 10590 |
| 5001 | $R_8$ 00011 | 13930 | 12823 | 12755 | 11648 | 12028 | 10921 | 10853 | 9746 | 11447 | 10340 | 10272 | 9165 | 9545 | 8438 |
| 8331 | $R_9$ 11101 | 17260 | 16153 | 16085 | 14978 | 15358 | 14251 | 14183 | 13076 | 14777 | 13670 | 13602 | 12495 | 12875 | 11768 |
| 6179 | $R_{10}$ 01101 | 15108 | 14001 | 13933 | 12826 | 13206 | 12099 | 12031 | 10924 | 12625 | 11518 | 11450 | 10343 | 10723 | |
| 5863 | $R_{11}$ 10101 | 14792 | 13685 | 13617 | 12510 | 12890 | 11783 | 11715 | 10608 | 12309 | 11202 | 11134 | 10027 | | |
| 3711 | $R_{12}$ 00101 | 12640 | 11533 | 11465 | 10358 | 10738 | 9631 | 9563 | 8456 | 10157 | 9050 | 8982 | | | |
| 7181 | $R_{13}$ 11001 | 16110 | 15003 | 14935 | 13828 | 14208 | 13101 | 13033 | 11926 | 13627 | 12520 | | | | |
| 5029 | $R_{14}$ 01001 | 13958 | 12851 | 12783 | 11676 | 12056 | 10949 | 10881 | 9774 | 11475 | | | | | |
| 4713 | $R_{15}$ 10001 | 13642 | 12535 | 12467 | 11360 | 11740 | 10633 | 10565 | 9458 | | | | | | |
| 2561 | $R_{16}$ 00001 | 11490 | 10383 | 10315 | 9208 | 9588 | 8481 | 8413 | | | | | | | |
| 8210 | $R_{17}$ 11110 | 17139 | 16032 | 15964 | 14857 | 15237 | 14130 | | | | | | | | |
| 6058 | $R_{18}$ 01110 | 14987 | 13880 | 13812 | 12705 | 13085 | | | | | | | | | |
| 5742 | $R_{19}$ 10110 | 14671 | 13564 | 13496 | 12389 | | | | | | | | | | |
| 3590 | $R_{20}$ 00110 | 12519 | 11412 | 11344 | | | | | | | | | | | |
| 7060 | $R_{21}$ 11010 | 15989 | 14882 | | | | | | | | | | | | |
| 4908 | $R_{22}$ 01010 | 13837 | | | | | | | | | | | | | |

54
Under = 9900
Target = 10000
Over = 10500

Fig 3b

| 16a \ 16b | | 5560 | 5492 | 4385 | 4765 | 3658 | 3590 | 2483 | 4184 | 3077 | 3009 | 1902 | 2282 | 1175 | 1107 |
|---|---|---|---|---|---|---|---|---|---|---|---|---|---|---|---|
| | | $R_{18}$ | $R_{19}$ | $R_{20}$ | $R_{21}$ | $R_{22}$ | $R_{23}$ | $R_{24}$ | $R_{25}$ | $R_{26}$ | $R_{27}$ | $R_{28}$ | $R_{29}$ | $R_{30}$ | $R_{31}$ |
| | | 01110 | 10110 | 00110 | 11010 | 01010 | 10010 | 00010 | 11100 | 01100 | 10100 | 00100 | | 01000 | 10000 |
| 10771 | $R_1$ 11111 | | | | | | | | | | | | | 11946 | 11878 |
| 8619 | $R_2$ 01111 | 33 | | | | | | | | | | | 10901 | 9794 | 9726 |
| 8303 | $R_3$ 10111 | 31 | | | | | | | 29 | | | 10205 | 10585 | 9478 | 9410 |
| 6151 | $R_4$ 00111 | | | | | | | | | | 9160 | 8053 | 8433 | 7326 | 7258 |
| 9621 | $R_5$ 11011 | 34 | | | | | | | | 12898 | 12630 | 11 32 | 11903 | 10796 | 10728 |
| 7469 | $R_6$ 01011 | | | | | | | 9952 | 11653 | 10546 | 10478 | 93 | 9751 | 8644 | 8576 |
| 7153 | $R_7$ 10011 | | | | | | | 9636 | 11337 | 10230 | 10162 | 9055 | 9435 | 8328 | 8260 |
| 5001 | $R_8$ 00011 | | | | | | 8591 | 7484 | 9185 | 8078 | 8010 | 6903 | 7283 | 6176 | 6108 |
| 8331 | $R_9$ 11101 | | | | | 11989 | 11921 | 10814 | 12515 | 11408 | 11340 | 10233 | 10613 | 9506 | 9438 |
| 6179 | $R_{10}$ 01101 | | | | 10944 | 9837 | 9769 | 8662 | 10363 | 9256 | 9188 | 8081 | 8461 | 7354 | 7286 |
| 5863 | $R_{11}$ 10101 | | | 10248 | 10628 | 9521 | 9453 | 8346 | 10047 | 8940 | 8872 | 7765 | 8145 | 7038 | 6970 |
| 3711 | $R_{12}$ 00101 | | 9203 | 8096 | 8476 | 7369 | 7301 | 6194 | 7895 | 6788 | 6720 | 5613 | 5993 | 4886 | 4818 |
| 7181 | $R_{13}$ 11001 | 12741 | 12673 | 11566 | 11946 | 10839 | 10771 | 9664 | 11365 | 10258 | 10190 | 9083 | 9463 | 8356 | 8288 |
| 5029 | $R_{14}$ 01001 | 10589 | 10521 | 9414 | 9794 | 8687 | 8619 | 7512 | 9213 | 8106 | 8038 | 6931 | 7311 | 6204 | 6136 |
| 4713 | $R_{15}$ 10001 | 10273 | 10205 | 9098 | 9478 | 8371 | 8303 | 7196 | 8897 | 7790 | 7722 | 6615 | 6995 | 5888 | 5820 |
| 2561 | $R_{16}$ 00001 | 8121 | 8053 | 6946 | 7326 | 6219 | 6151 | 5044 | 6745 | 5638 | 5570 | 4463 | 4843 | 3736 | 3668 |
| 8210 | $R_{17}$ 11110 | 13770 | 13702 | 12595 | 12975 | 11868 | 11800 | 10693 | 12394 | 11287 | 11219 | 10112 | 10492 | 9385 | 9317 |
| 6058 | $R_{18}$ 01110 | 11618 | 11550 | 10443 | 10823 | 9716 | 9648 | 8541 | 10242 | 9135 | 9067 | 7960 | 8340 | 7233 | 7165 |
| 5742 | $R_{19}$ 10110 | 11302 | 11234 | 10127 | 10507 | 9400 | 9332 | 8225 | 9926 | 8819 | 8751 | 7644 | 8024 | 6917 | 6849 |
| 3590 | $R_{20}$ 00110 | 9150 | 9082 | 7975 | 8355 | 7248 | 7180 | 6073 | 7774 | 6667 | 6599 | 5492 | 5872 | 4765 | 4697 |
| 7060 | $R_{21}$ 11010 | 12620 | 12552 | 11445 | 11825 | 10718 | 10650 | 9543 | 11244 | 10137 | 10069 | 8962 | 9342 | 8235 | 8167 |
| 4908 | $R_{22}$ 01010 | 10468 | 10400 | 9293 | 9673 | 8566 | 8498 | 7391 | 9092 | 7985 | 7917 | 6810 | 7190 | 6083 | 6015 |
| 4592 | $R_{23}$ 10010 | 10152 | 10084 | 8977 | 9357 | 8250 | 8182 | 7075 | 8776 | 7669 | 7601 | 6494 | 6874 | 5767 | 5699 |

Fig 3c

| | 16b | 8929 | 7822 | 7754 | 6647 | 7027 | 5920 | 5852 | 4745 | 6446 | 5339 | 5271 | 4164 | 4544 | 3437 |
|---|---|---|---|---|---|---|---|---|---|---|---|---|---|---|---|
| | | $R_1$ | $R_2$ | $R_3$ | $R_4$ | $R_5$ | $R_6$ | $R_7$ | $R_8$ | $R_9$ | $R_{10}$ | $R_{11}$ | $R_{12}$ | $R_{13}$ | $R_{14}$ |
| 16a | | 11111 | 01111 | 10111 | 00111 | 11011 | 01011 | 10011 | 00011 | 11101 | 01101 | 10101 | 00101 | 11001 | 01001 |
| 8331 | $R_9$ 11101 | 17260 | 16153 | 16085 | 14978 | 15358 | 14251 | 14183 | 13076 | 14777 | 13670 | 13602 | 12495 | 12875 | 11768 |
| 6179 | $R_{10}$ 01101 | 15108 | 14001 | 13933 | 12826 | 13206 | 12099 | 12031 | 10924 | 12625 | 11518 | 11450 | 10343 | 10723 | 9616 |
| 5863 | $R_{11}$ 10101 | 14792 | 13685 | 13617 | 12510 | 12890 | 11783 | 11715 | 10608 | 12309 | 11202 | 11134 | 10027 | 10407 | 9300 |
| 3711 | $R_{12}$ 00101 | 12640 | 11533 | 11465 | 10358 | 10738 | 9631 | 9563 | 8456 | 10157 | 9050 | 8982 | 7875 | 8255 | 7148 |
| 7181 | $R_{13}$ 11001 | 16110 | 15003 | 14935 | 13828 | 14208 | 13101 | 13033 | 11926 | 13627 | 12520 | 12452 | 11₃ 40b | | 10618 |
| 5029 | $R_{14}$ 01001 | 13958 | 12851 | 12783 | 11676 | 12056 | 10949 | 10881 | 9774 | 11475 | 10368 | 10300 | ₅919 | | 8466 |
| 4713 | $R_{15}$ 10001 | 13642 | 12535 | 12467 | 11360 | 11740 | 10633 | 10565 | 9458 | 11159 | 10052 | 9984 | 8877 | 9257 | 8150 |
| 2561 | $R_{16}$ 00001 | 11490 | 10383 | 10315 | 9208 | 9588 | 8481 | 8413 | 7306 | 9007 | 7900 | 7832 | 6725 | 7105 | 5998 |
| 8210 | $R_{17}$ 11110 | 17139 | 16032 | 15964 | 14857 | 15237 | 14130 | 14062 | 12955 | 14656 | 13549 | 13481 | 12374 | 12754 | 11647 |
| 6058 | $R_{18}$ 01110 | 14987 | 13880 | 13812 | 12705 | 13085 | 11978 | 11910 | 10803 | 12504 | 11397 | 11329 | 10222 | 10602 | 9495 |
| 5742 | $R_{19}$ 10110 | 14671 | 13564 | 13496 | 12389 | 12769 | 11662 | 11594 | 10487 | 12188 | 11081 | 11013 | 9906 | 10286 | 9179 |
| 3590 | $R_{20}$ 00110 | 12519 | 11412 | 11344 | 10237 | 10617 | 9510 | 9442 | 8335 | 10036 | 8929 | 8861 | 7754 | 8134 | |
| 7060 | $R_{21}$ 11010 | 15989 | 14882 | 14814 | 13707 | 14087 | 12980 | 12912 | 11805 | 13506 | 12399 | 12331 | 11224 | | |
| 4908 | $R_{22}$ 01010 | 13837 | 12730 | 12662 | 11555 | 11935 | 10828 | 10760 | 9653 | 11354 | 10247 | 10179 | | | |
| 4592 | $R_{23}$ 10010 | 13521 | 12414 | 12346 | 11239 | 11619 | 10512 | 10444 | 9337 | 11038 | 9931 | | | | |
| 2440 | $R_{24}$ 00010 | 11369 | 10262 | 10194 | 9087 | 9467 | 8360 | 8292 | 7185 | 8886 | | | | | |
| 5770 | $R_{25}$ 11100 | 14699 | 13592 | 13524 | 12417 | 12797 | 11690 | 11622 | 10515 | | | | | | |
| 3618 | $R_{26}$ 01100 | 12547 | 11440 | 11372 | 10265 | 10645 | 9538 | 9470 | | | | | | | |
| 3302 | $R_{27}$ 10100 | 12231 | 11124 | 11056 | 9949 | 10329 | 9222 | | | | | | | | |
| 1150 | $R_{28}$ 00100 | 10079 | 8972 | 8904 | 7797 | 8177 | | | | | | | | | |
| 4620 | $R_{29}$ 11000 | 13549 | 12442 | 12374 | 11267 | | | | | | | | | | |
| 2468 | $R_{30}$ 01000 | 11397 | 10290 | 10222 | | | | | | | | | | | |
| 2152 | $R_{31}$ 10000 | 11081 | 9974 | | | | | | | | | | | | |

| | 4a | | | 7a |
|---|---|---|---|---|
| Weigh Machine #1 | 2152 | Weigh Machine Timer #1 | 13:34.59 |
| Weigh Machine #2 | 2262 | Weigh Machine Timer #2 | 15:01.30 |
| Weigh Machine #3 | 2483 | Weigh Machine Timer #3 | 18:12.45 |
| Weigh Machine #4 | 2440 | Weigh Machine Timer #4 | 05:50.12 |
| Weigh Machine #5 | 1175 | Weigh Machine Timer #5 | 22:15.45 |
| Weigh Machine #6 | 1902 | Weigh Machine Timer #6 | 18:17.15 |
| Weigh Machine #7 | 2468 | Weigh Machine Timer #7 | 12:50.00 |
| Weigh Machine #8 | 1107 | Weigh Machine Timer #8 | 23:05.36 |
| Weigh Machine #9 | 2561 | Weigh Machine Timer #9 | 02:37.51 |
| Weigh Machine #10 | 1150 | Weigh Machine Timer #10 | 07:53.52 |

Fig. 6

| | 10a | | |
|---|---|---|---|
| Weigh Machine #9 | 2561 | Weigh Machine Timer #9 | 02:37.51 |
| Weigh Machine #4 | 2440 | Weigh Machine Timer #4 | 05:50.12 |
| Weigh Machine #10 | 1150 | Weigh Machine Timer #10 | 07:53.52 |
| Weigh Machine #7 | 2468 | Weigh Machine Timer #7 | 12:50.00 |
| Weigh Machine #1 | 2152 | Weigh Machine Timer #1 | 13:34.59 |

| | 11a | | |
|---|---|---|---|
| Weigh Machine #2 | 2262 | Weigh Machine Timer #2 | 15:01.30 |
| Weigh Machine #3 | 2483 | Weigh Machine Timer #3 | 18:12.45 |
| Weigh Machine #6 | 1902 | Weigh Machine Timer #6 | 18:17.15 |
| Weigh Machine #5 | 1175 | Weigh Machine Timer #5 | 22:15.45 |
| Weigh Machine #8 | 1107 | Weigh Machine Timer #8 | 23:05.36 |

Fig 7

|  | Primary Group | Secondary Group |  |
|---|---|---|---|
| 10a | 50b(9) 2561 | 2262 (2) | |
| | 50c(4) 2440 | 2483 (3) | |
| | 50d(10) 1150 | 1902 (6) | 11a |
| | 50e(7) 2468 | 1175 (5) | |
| | 50f(1) 2152 | 1107 (6) | |

Fig. 8

50a
Primary Group Only

| 1 | 7 | 10 | 4 | 9 |
|---|---|---|---|---|
| 50f | 50e | 50d | 50c | 50b |
| 0 | 0 | 0 | 0 | 1 |

|  | 50 | 13a | 14a |
|---|---|---|---|
| $R_{16}$ | 00001 | 2561 | 2262 |
| $R_8$ | 00011 | 5001 | 4745 |
| $R_{24}$ | 00010 | 2440 | 2483 |
| $R_{20}$ | 00110 | 3590 | 4385 |
| $R_{28}$ | 00100 | 1150 | 1902 |
| $R_{12}$ | 00101 | 3711 | 4164 |
| $R_4$ | 00111 | 6151 | 6647 |
| $R_2$ | 01111 | 8619 | 7822 |
| $R_6$ | 01011 | 7469 | 5920 |
| $R_{22}$ | 01010 | 4908 | 3658 |
| $R_{18}$ | 01110 | 6058 | 5560 |
| $R_{26}$ | 01100 | 3618 | 3077 |
| $R_{10}$ | 01101 | 6179 | 5339 |
| $R_{14}$ | 01001 | 5029 | 3437 |
| $R_{30}$ | 01000 | 2468 | 1175 |
| $R_{29}$ | 11000 | 4620 | 2282 |
| $R_{13}$ | 11001 | 7181 | 4544 |
| $R_9$ | 11101 | 8331 | 6446 |
| $R_{25}$ | 11100 | 5770 | 4184 |
| $R_{17}$ | 11110 | 8210 | 6667 |
| $R_{21}$ | 11010 | 7060 | 4765 |
| $R_5$ | 11011 | 9621 | 7027 |
| 50g $R_1$ | 11111 | 10771 | 8929 |
| $R_3$ | 10111 | 8303 | 7754 |
| $R_{11}$ | 10101 | 5863 | 5271 |
| $R_{27}$ | 10100 | 3302 | 3009 |
| $R_{19}$ | 10110 | 5742 | 5492 |
| $R_{23}$ | 10010 | 4592 | 3590 |
| $R_7$ | 10011 | 7153 | 5852 |
| $R_{15}$ | 10001 | 4713 | 3369 |
| $R_{31}$ | 10000 | 2152 | 1107 |

SCALE WEIGHT COMBINATION SELECTION SYSTEM

BACKGROUND OF THE INVENTION

The present invention relates to scale weight combination selections systems for selecting the most appropriate combination of weights in combinational weight machines.

These combinational weight machines are designed to select from a plurality of product weighing scales, the quantity of product that is most desirable, depending upon the objectives of the system. The product is not limited to foodstuffs and can include hardware product and soft goods products, as well, basically most non-liquid particulate product. These machines generally include an in-feeding system where the particulate product flows in a single stream. In one conventional combinational weighing machine, the bulk material is delivered to a central location in a machine and then fed radially outwardly to each of the scale areas, which generally includes a vibrator and a hopper or chamber to collect product flowing off the vibrator or belt conveyor. These scale chambers may be loaded simultaneously but not necessarily depending upon the speed of the machine.

In the past, scale weight combination selection systems have become increasingly common through the discovery and development of the microprocessor, which is capable of sampling multiple combination scales in a very short period and calculating which combination thus satisfies and provides a target weight. When the best weight combination has been identified, those scales belonging to the combination are dumped into a common chute which discharges the collected product into a package associated with a packaging machine. This process is easily effected repeatedly by a microprocessor with the scales reloaded while the dump scale is eliminated from the search process until they are reloaded.

Examples of these systems which attempt to provide a total weight closely approximating or equaling a target weight include systems disclosed in the Minamida, et al., U.S. Pat. No. 4,396,078, and the Mosher, et al., U.S. Pat. No. 4,466,500.

The versatility and speed of microprocessors permit a multitude of scales to be examined during the search process and permit weight parameters to be easily adjusted in accordance with differing product weight and production demands. It is important that the weight information and scale be accurate throughout extended periods of use and not be effected by drift in the components which process the weight information.

Calibration systems are generally employed in the scale to periodically update the weighing parameters used by the microprocessor. A procedure to weigh an empty scale will determine a tare or correction routinely while machine is in operation.

Furthermore, weight sampling is complicated by environmental factors such as temperature and humidity, as well as the resilient mouths for the vibrator and loading devices, as well as the mounting arrangements for measuring sensors in the scales. All of these elements introduce errors into the weighing process.

There is significant prior art directed to microprocessors for these combinational scale systems, but to a large extent, these systems have been predominantly directed to minimizing the number of calculations to improve cycle speed. However, with the very marked improvement in event speed for microprocessors of the present day, and the outlook for significant increase in microprocessor speeds in the very near future, the elimination of certain combinational calculations by the microprocessor in prior art systems has practically no effect on present day overall cycle speeds, bearing in mind both the limited number of scales even in higher order machines over 16 scales, and the mechanical limitations of the multiple scale weighing machine itself.

In the Minamida, et al., U.S. Pat. No. 4,396,078, a weighing or counting method is disclosed which provides for the discharge of articles from a weighing machine corresponding to a selected combination, and during the subsequent feeding of fresh articles into the same weighing machines, the system functions at that time to select combinations on the basis of weight data from a fixed number of weighing machines which were not selected or did not discharge from the previous cycle. While such a feature is cycle improving, it in effect doubles the number of scales required because only effectively half the scales are used in every cycle. For example, in higher order scale machines, a 16 effective scale machine would require 32 scales, an extremely large and expensive machine.

In the Mosher, et al., U.S. Pat. No. 4,466,500, a combinational weight system is provided which selects the minimum qualified weight identified through a search operation based upon an ordered search sequence of all combinations of scales. The search is conducted by a search control means which has a means for eliminating from the search, combinations of scales having sub-combinations previously searched and found to be at or above the target weight. Elimination of certain combinations from the search sequence reduces cycle time. The search sequence is also established by adding one new or different scale to the combinations or sub-combinations previously searched. In that manner, the Mosher, et al. system minimizes the volume of data manipulated during each step of the search sequence with an improvement in cycle time. However, because microprocessor cycle times at the time of the 1982 filing date of the Mosher, et al. underlying application, were but a fraction of the microprocessor cycle times today, this system no longer has any significant viable cost-saving benefit.

It is a primary object of the present invention to ameliorate the problems noted above in prior art combination selection systems.

SUMMARY OF THE PRESENT INVENTION

In accordance with the present invention, a scale weight combination selection system is provided for selecting the most appropriate combination scale weights in combinational weight machines.

Combinational weight machines are designed to select from a plurality of product weighing scales, the quantity of product that is most desirable, depending upon the objective of the system. Product is not limited to foodstuffs and can include hardware product, soft goods product, and basically most non-liquid particulate products.

The present system is best utilized in higher order scale weighing machines; namely, 16 scales and above, although the invention is not limited thereto, and includes a microprocessor control that date stamps each of the scale weights as the scales are loaded. The scale weights are then sorted into date stamps and then divided into two groups; the first group being the earlier date stamps, and the second being the later date stamps.

The system then calculates all possible combinations in each group utilizing a digital code with code position representing a specific scale.

Any suitable digital code can be used for this purpose, although a gray code is exemplified in the present detailed description.

Thereafter, the digitally coded marked combinations in each group are sorted, utilizing a unique formula that gives preference to both the earliest date stamp scale weights and the combinations having the greatest number of scales.

An arithmetic logic unit in the microprocessor then sequentially scans the combinations in the first group (primary group) and combines them(adds) in the ranked order with the combinations in the second group(secondary group), also in ranked order. This preferential scanning order is further enhanced by an exact weight comparative system that automatically ends the scanning cycle if an exact weight is achieved. In the absence of an exact weight, however, the ranked order scanning and combining of the primary group combinations with the secondary group combinations will proceed until completion, with one caveat, and that is a fail-safe system ends the cycle in the event that a scale is in the system an excessive length of time, and this sub-system combines that scale and executes a discharge prior to completion of all possible primary group and secondary group combinations.

In order to improve cycle speed, a previous selection of an appropriate combination after discharge is eliminated from the next combination calculation. For example, in a 16 scale machine, if the selected combination is 5, and the appropriate discharge of those 5 chambers was in process, the system can begin a new cycle combination on the remaining 11 scale chambers instead of delaying the process awaiting the loading of the 5 used chambers. In that instance, all of the feeding devices, whether they be belts or vibrators associated with the scale chambers, would not be operating simultaneously. These feeders, one being provided for each scale, can deliver product either into a chamber upstream of the scale, or in some cases in less expensive systems, directly to the scale itself. These feeding devices are timed so that they feed an approximate fractional target weight of product into the scale upstream chamber. These upstream chambers are then discharged onto the scales where they are weighed and the weights of each scale are then stored in memory.

These weights are stored in a microprocessor which usually computes all possible scale weight combinations but in higher order scales(above 16) limits the number of combinations to reduce cycle time. In order to understand how the present systems work, it is necessary to provide a definition of "target weight". In a 16 scale system, the target weight may, for example, be 1 lb. or 16 oz. In a 16 scale machine in which the total target product weight is 16.0 oz., the fractional target weight for each scale should be selected at 2 oz. because 2 oz. requires the use of 8 scales. Eight scales in a 16 scale machine have 12,870 combinations, while 7 scales have 11,440, as does 9 scales. Therefore, the 8 scale combination has the greatest number of combinations, and hence, the greater likelihood for achieving delivery closer to the target weight of 16.000 oz.

In one case, these scales are positioned within a funnel-shaped device, or a common reservoir that fills the product package at the total exact target weight. Each scale has a solenoid operator that, in most cases, pivots a door or a flap to discharge the product into the funnel. Stepper motors can also be utilized instead of solenoids. Typically, there is a single funnel in a circular type machine that surrounds all of the scale areas and provides the common discharge into the single product package.

There are also inline machines which utilize a single rectangular hopper.

In accordance with the present invention, the microprocessor arranges each of the stored scale weights according to time in the system and gives the highest priority to that scale that has been in the system the longest. For example, if scale number 12 were in the system the shortest time, it would be ranked first after rearrangement by the microprocessor, and all combinations using scale 12 are computed first. In this process, each of the scales is given a time stamp so that the oldest in the system scale will have the earliest time date. This rearrangement of scale weights into time priority occurs on each cycle of the machine. In the above example, when 8 of the 16 scales have been discharged, half of those 8 scales have been refilled, and they each will receive a new time stamp and, of course, they will have approximately the same time stamp. The refilled machines will then have a later time stamp and less priority and thus the unused scales in the next combination cycle will be the preferred scales, but not necessarily the ones selected depending upon the weight calculation which will be explained hereinafter.

While this rearrangement process occurs each cycle, it does not necessarily occur at a particular point in the cycle and is not critical thereto.

As discussed above, this rearranged scale order is then divided in half into two groups: one, a primary group; and one, a secondary group. The primary group consists of the first 8 scales with the earliest time stamps, and the secondary group consists of the remaining 8 scales with the later time stamps. The methodology in dividing the scale weights into primary and secondary groups is to facilitate combining each primary group weight with each secondary group weight to analyze the weight combinations.

Thereafter, using a gray code or some other digital combination code, the microprocessor calculates all possible weight combinations in the primary group and all possible weight combinations in the secondary group, and those are stored in memory.

Then the microprocessor uses a ranking order for the primary and secondary group combinations utilized to combine each combination in the primary group with all of the combinations in the secondary group. In this machination, the combining calculation begins with by combining all of the scales in the primary group with each of the scales in the secondary group in the ranking sequence. The combination of all 8 primary scales then proceeds next with a combination of 7, 6, 5, 4, etc. of the scales in the secondary group, then 8, 6, 5, 4, etc.

This same calculation continues next with 7 of the oldest scales in the primary group combined first with 8 of the scales in the secondary group and then [sequentially] the next ranked combinations 7, 6, 5, 4, etc., then 8, 6, 5, 4, etc. and repeated in order of the ranking formula.

BRIEF DESCRIPTION OF THE DRAWINGS

FIGS. 3a, 3b, and 3c are a summation chart for the primary and secondary groups;

DETAILED DESCRIPTION OF THE PREFERRED EMBODIMENTS

Figure 1:
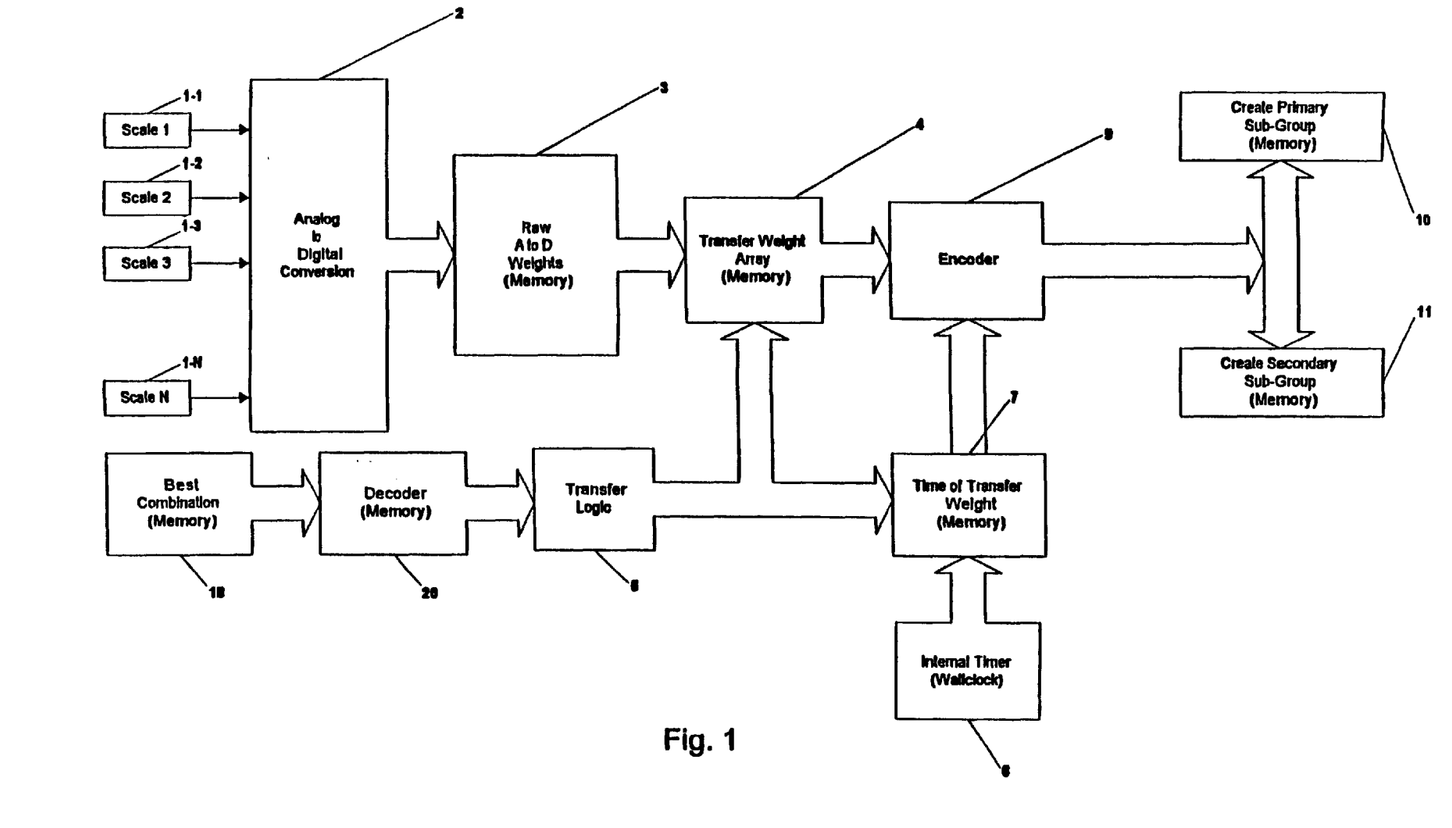
FIG. 1 is a block diagram of the overall combination selection system.

Referring to FIG. 1, a block diagram of the general arrangement of the present system is illustrated, and is seen to include a plurality of scales 1-1 through 1-N. It should be understood that in the Summary of the Present Invention, we have drawn an illustration exemplifying 16 scales, and that in the following Detailed Description, we will refer to an example of 10 scales, but it should be understood that the present invention preferably obtains full advantage utilizing a higher order number of scales, preferably 16 or above. The 10 scale illustration used in this Detailed Description is limited to 10 simply to reduce the volume of calculations illustrated and for no other purpose. In this regard, the term "scale" refers not just to the number of scales, but to the total number of compartments in systems where the scales feed more than one compartment.

The weights measured in each of the scales 1-1 to 1-N are converted in analog to digital converter 2, and the resulting digital values are transferred to a microprocessor memory 3, and then these values are transferred to a transfer weight array memory 4. The A to D memory 3 continually samples scale weights from the converter 2 while the transfer weight array memory 4 stores the scale or compartment weight memory values utilized in the following calculations. This compensates for configuring the system to either scale only systems or systems utilizing scales with multiple compartments. The order of memory in the transfer weight array 4 is simply the scale or compartment order.

The transfer logic circuit 5 is, in large part, separate from the microprocessor and activates the necessary solenoids and motors that control the combinational weight machine itself.

Figure 7:
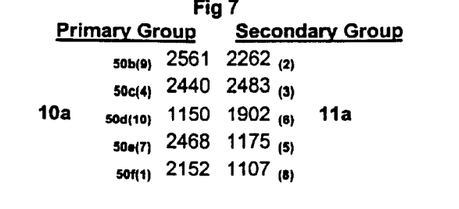
FIG. 7 is a chart of the sorted weights in the primary and secondary groups.

The internal timer 6 is a free-running clock and memory in the microprocessor. When the transfer logic circuit 5 executes a specific selective combination of weights and controls the machine to physically discharge that combination of weights, the transfer logic circuit 5 initiates the transfer of the raw data weights in memory 3 to the transfer weight array 4. At the same moment that is done, the internal timer memory 6 data is transferred into the timer of transfer weight memory 7 which date-stamps each of the weights in the transfer weight array in scale order, although of course that is not necessarily the full number of scales in each of these transfer and date stamp cycles. The date stamps and order of arrangement of weights is illustrated at FIG. 7, noting that the weights are arranged not by date stamp, but by scale number. Note at FIG. 7, that the weights 4a are those weights stored in the transfer weight array 4, in order of scale number.

Figure 5:
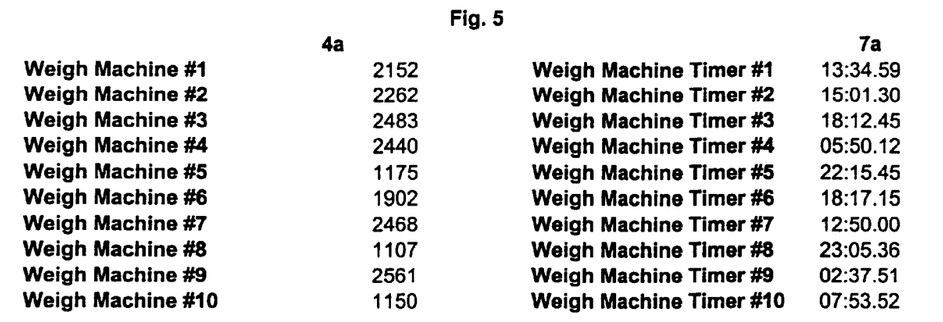
FIG. 5 is a chart illustrating the weight machines in numerical order and date stamped.
Figure 6:
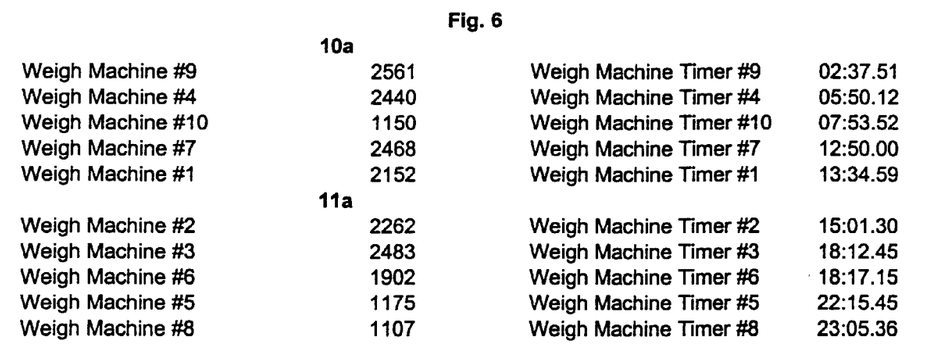
FIG. 6 is a chart showing the weight machines divided into primary and secondary groups and sorted according to date stamps.

The encoder 9 then sorts the scale weights using the Time of Transfer Weight array 7, illustrated in FIG. 5 according to time with the earliest time first as illustrated in FIG. 6. The encoder 9 searches the date stamp 7a and stores the weights 4a(in FIG. 5) in the primary sub-group memory 10, and the secondary sub-group memory 11. In, for example, the 10 scale system described in this Detailed Description, the first oldest five scale weights are stored by the encoder 9 in the primary sub-group memory 10, and the second oldest five scale weights are stored by encoder 9 in secondary sub-group memory 11, both in date stamp order. These weight values and their order are illustrated at 10a and 11a in FIG. 7.

Combinational weight systems have two distinct configurations: one being a dependent system, and one being an independent system. In an independent system, which is the one described generally above, each scale has a single weight chamber. In a dependent system, each scale feeds multiple chambers, and obviously these chambers are filled serially so that each of, for example, two chambers associated with a single scale will bear different date stamps, and the machine mechanism dictates which chamber is filled first, and hence will have the earlier date stamp. The encoder 9 always selects the first filled chamber for the primary group, and the second filled chamber for the secondary group in dependent systems.

The best combination memory 18 is transferred to the decoder memory 20 illustrated in FIG. 1 contains the data resulting from the calculations described in conjunction with the following figures.

Figure 2:
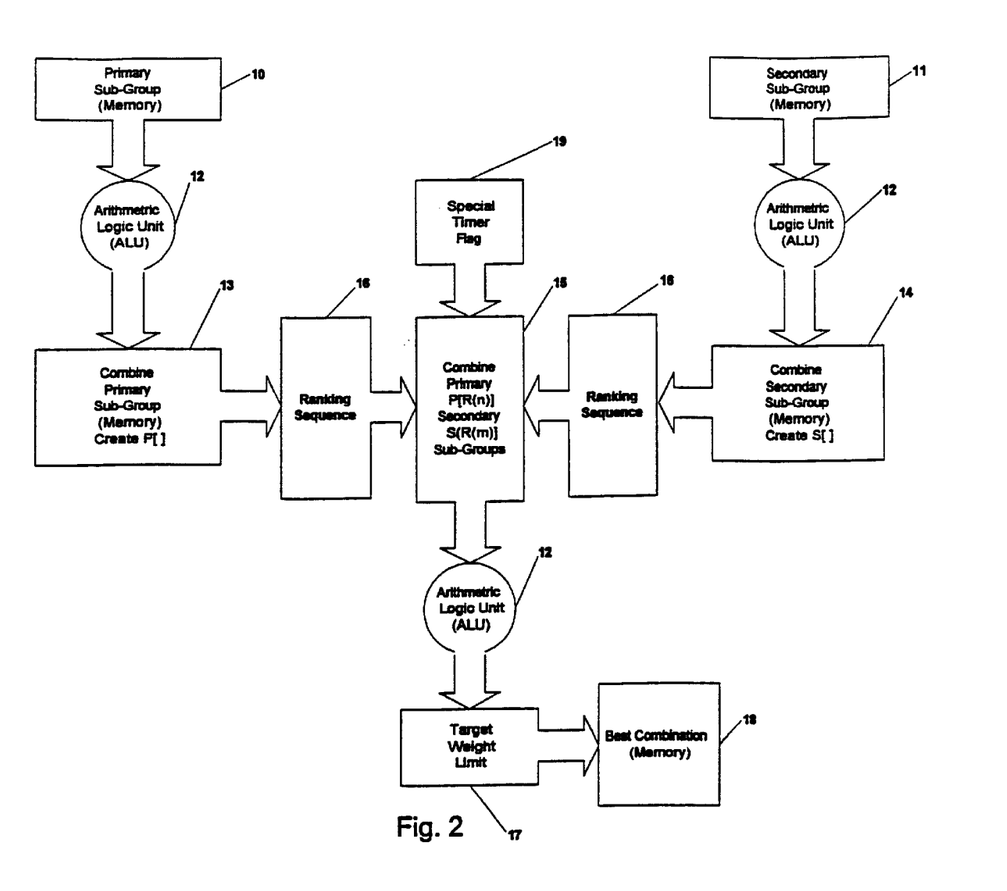
FIG. 2 is a block diagram of certain of the components illustrated in FIG. 1, with certain additional components.

Viewing FIG. 2, one will note that several of the function blocks illustrated are common with that shown in FIG. 1, particularly the Best Combination 18, primary subgroup memory 10 and secondary sub-group memory 11.

Figure 8:
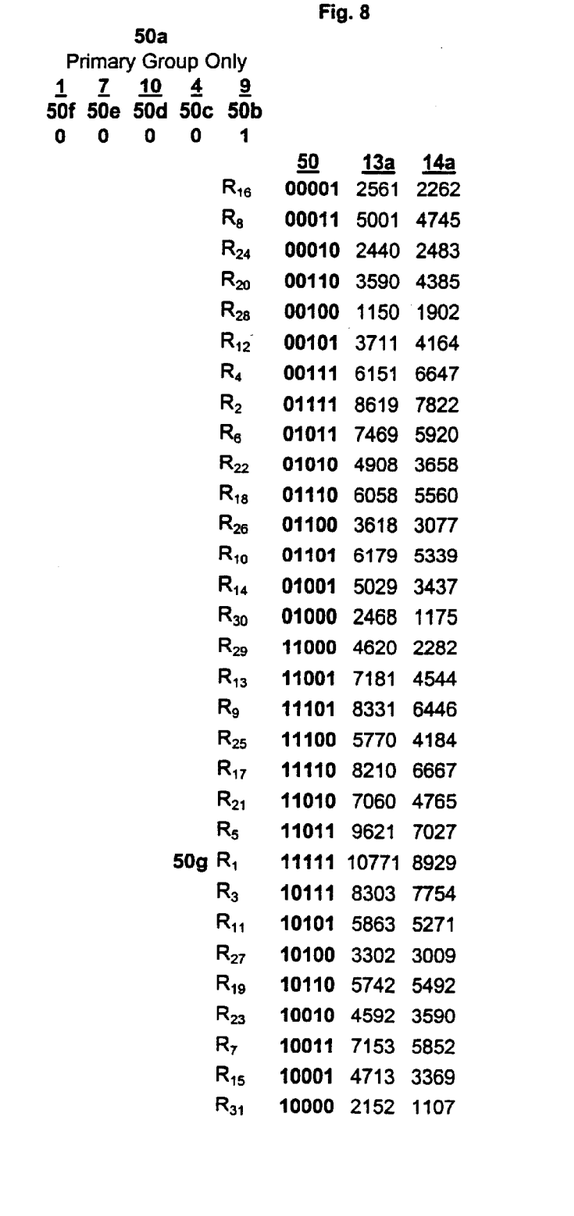
FIG. 8 is a chart illustrating all combinations of the primary group and all combinations of the secondary group with a digital code assigned to each combination.

The combine primary sub-group memory 13 calculates all combinations of weights in the primary group memory 10 and stores them, each individually, and this calculation and storage position is illustrated at 13a in FIG. 8. Memory 13 stores each combination with an associated gray code 50(50a in FIG. 8) that represents the scale weights included in the combination with the oldest scale weight in the right position and the youngest in the left position. In all the combinations shown, position 50b is scale 9, position 50c scale 4, 50d scale 10, 50e scale 7, and position 50f is scale 1. (This refers to all of the primary group scales only; the secondary scales are scales 2, 3, 6, 5, and 8 in that order, right to left in the same code). Thus, combination 50a includes only scale 9, and combination 50g includes all the primary group scales.

The combine secondary sub-group and memory 14 performs the same calculation and arrangement and memory from the sub-group memory 11, and this is illustrated at 14a in FIG. 8.

The arithmetic logic unit 12 is an element in the microprocessor that enables it to perform calculations, such as adding, subtracting, multiplying, and dividing. The code 50 illustrated in FIG. 8 is generated in the combine primary sub-group 13 and the combine secondary sub-group 14 and is in essence an add 1 or subtract 1 sequence for developing all possible combinations of the weight values 10a and 11a in FIG. 7.

The ranking sequence 16 determines the order of retrieval of the weight values in memories 13 and 14 when utilized by the combine primary and secondary sub-groups by ranked order 16, a sequence different than the combination sequence shown at 13a in FIG. 10.

The ranking sequence 16 is ordered and executed according to the following recursive formula:

Where:

N = Total number to participate in sub-group
R = Rank Order such that:
$R_1$ = First Ranked Combination
$R_{2^N-1}$ = Last Ranked Combination $R_1 = 2^N - 1$
$R_2 = R_1 - 2^{N-1}$ $$R_{x+2^1} = \sum_{x=1}^{2^1} (R_x - 2^{N-2})$$

$$R_{x+2^2} = \sum_{x=1}^{2^2} (R_x - 2^{N-3})$$

. . .

$$R_{x+2^{N-3}} = \sum_{x=1}^{2^{N-3}} (R_x - 2^2)$$

$$R_{x+2^{N-2}} = \sum_{x=1}^{2^{N-2}} (R_x - 2^1)$$

$$R_{x+2^{N-1}} = \sum_{x=1}^{2^{N-1}} (R_x - 2^0)$$

Rank sequence for given example:
N = Total number to participate in sub-group
  N = 5
R = Rank Order
  $R_1$ = First Ranked Combination
  $R_2$ = Second Ranked Combination
  $R_3$ = Third Ranked Combination
  $R_{31}$ = Third Ranked Combination
$R_1 = 2^5 - 1$
  $R_1 = 31_{BASE10} = 11111_{BASE2}$
$R_2 = R_1 - 10000_{BASE2}$
  $R_2 = 15_{BASE10} = 01111_{BASE2}$
$R_3 = R_1 - 01000_{BASE2}$
$R_4 = R_2 - 01000_{BASE2}$
  $R_3 = 23_{BASE10} = 10111_{BASE2}$
  $R_4 = 7_{BASE10} = 00111_{BASE2}$
$R_5 = R_1 - 00100_{BASE2}$
$R_6 = R_2 - 00100_{BASE2}$
$R_7 = R_3 - 00100_{BASE2}$
$R_8 = R_4 - 00100_{BASE2}$
  $R_5 = 27_{BASE10} = 11011_{BASE2}$
  $R_6 = 11_{BASE10} = 01011_{BASE2}$
  $R_7 = 19_{BASE10} = 10011_{BASE2}$
  $R_8 = 3_{BASE10} = 00011_{BASE2}$
$R_9 = R_1 - 00010_{BASE2}$
$R_{10} = R_2 - 00010_{BASE2}$
$R_{11} = R_3 - 00010_{BASE2}$
$R_{12} = R_4 - 00010_{BASE2}$
$R_{13} = R_5 - 00010_{BASE2}$
$R_{14} = R_6 - 00010_{BASE2}$
$R_{15} = R_7 - 00010_{BASE2}$
$R_{16} = R_8 - 00010_{BASE2}$
  $R_9 = 29_{BASE10} = 11101_{BASE2}$
  $R_{10} = 13_{BASE10} = 01101_{BASE2}$
  $R_{11} = 21_{BASE10} = 10101_{BASE2}$
  $R_{12} = 5_{BASE10} = 00101_{BASE2}$
  $R_{13} = 25_{BASE10} = 11001_{BASE2}$
  $R_{14} = 9_{BASE10} = 01001_{BASE2}$
  $R_{15} = 17_{BASE10} = 10001_{BASE2}$
  $R_{16} = 1_{BASE10} = 00001_{BASE2}$
$R_{17} = R_1 - 00001_{BASE2}$
$R_{18} = R_2 - 00001_{BASE2}$
$R_{19} = R_3 - 00001_{BASE2}$ -continued N = Total number to participate in sub-group
R = Rank Order such that:
$R_1$ = First Ranked Combination
$R_{2^N-1}$ = Last Ranked Combination $R_{20} = R_4 - 00001_{BASE2}$
$R_{21} = R_5 - 00001_{BASE2}$
$R_{22} = R_6 - 00001_{BASE2}$
$R_{23} = R_7 - 00001_{BASE2}$
$R_{24} = R_8 - 00001_{BASE2}$
$R_{25} = R_9 - 00001_{BASE2}$
$R_{26} = R_{10} - 00001_{BASE2}$
$R_{27} = R_{11} - 00001_{BASE2}$
$R_{28} = R_{12} - 00001_{BASE2}$
$R_{29} = R_{13} - 00001_{BASE2}$
$R_{30} = R_{14} - 00001_{BASE2}$
$R_{31} = R_{15} - 00001_{BASE2}$
  $R_{17} = 30_{BASE10} = 11110_{BASE2}$
  $R_{18} = 14_{BASE10} = 01110_{BASE2}$
  $R_{19} = 22_{BASE10} = 10110_{BASE2}$
  $R_{20} = 6_{BASE10} = 00110_{BASE2}$
  $R_{21} = 26_{BASE10} = 11010_{BASE2}$
  $R_{22} = 10_{BASE10} = 01010_{BASE2}$
  $R_{23} = 18_{BASE10} = 10010_{BASE2}$
  $R_{24} = 2_{BASE10} = 00010_{BASE2}$
  $R_{25} = 28_{BASE10} = 11100_{BASE2}$
  $R_{26} = 12_{BASE10} = 01100_{BASE2}$
  $R_{27} = 20_{BASE10} = 10100_{BASE2}$
  $R_{28} = 4_{BASE10} = 00100_{BASE2}$
  $R_{29} = 24_{BASE10} = 11000_{BASE2}$
  $R_{30} = 8_{BASE10} = 01000_{BASE2}$
  $R_{31} = 16_{BASE10} = 10000_{BASE2}$ The ranking order 16 utilizes the above formula to rank the combination of scales in the primary and secondary sub-groups with the objective of giving priority or preference to the oldest scales and largest number of scales in the combination. That is, viewing FIG. 3a, the highest priority combination 11111, utilizes all scales in the primary group, which of course is the older group, and utilizes obviously the oldest scale 9 represented by the right "1" in the code as noted above. The second ranked primary group combination, 01111, utilizes the four oldest of the five scales in the primary group and eliminates the latest date scale, scale 1, and this methodology continues based upon the formula described above. The least preferred combination 52 utilizes only the latest date scale 1 in the primary group.

This ranking sequence is illustrated by the order of the primary group values 16a top-down in FIG. 3, and the order of the secondary group values 16b illustrated in FIG. 3, left to right. The chart illustrated in FIG. 3 is illustrative only in the sense that the chart itself is not generated in the microprocessor, but rather is the result of the calculations in the microprocessor.

The combine primary and secondary sub-groups 15 combines(adds) the primary sub-group values at 16a with the secondary sub-group values in 16b in an order of priority and creates the combined scale weights in the matrix of FIG. 3. It does so in the order of ranking in FIG. 3 by beginning in the upper left of FIG. 3a.

The target weight limit 17 sets the outer parameters for acceptable weights to be preliminarily stored for later consideration. For example, the weight limit 17 might set 10.5 oz. as the high and 9.9 oz. as the low, as illustrated at 54 in FIG. 3a.

Figure 4:
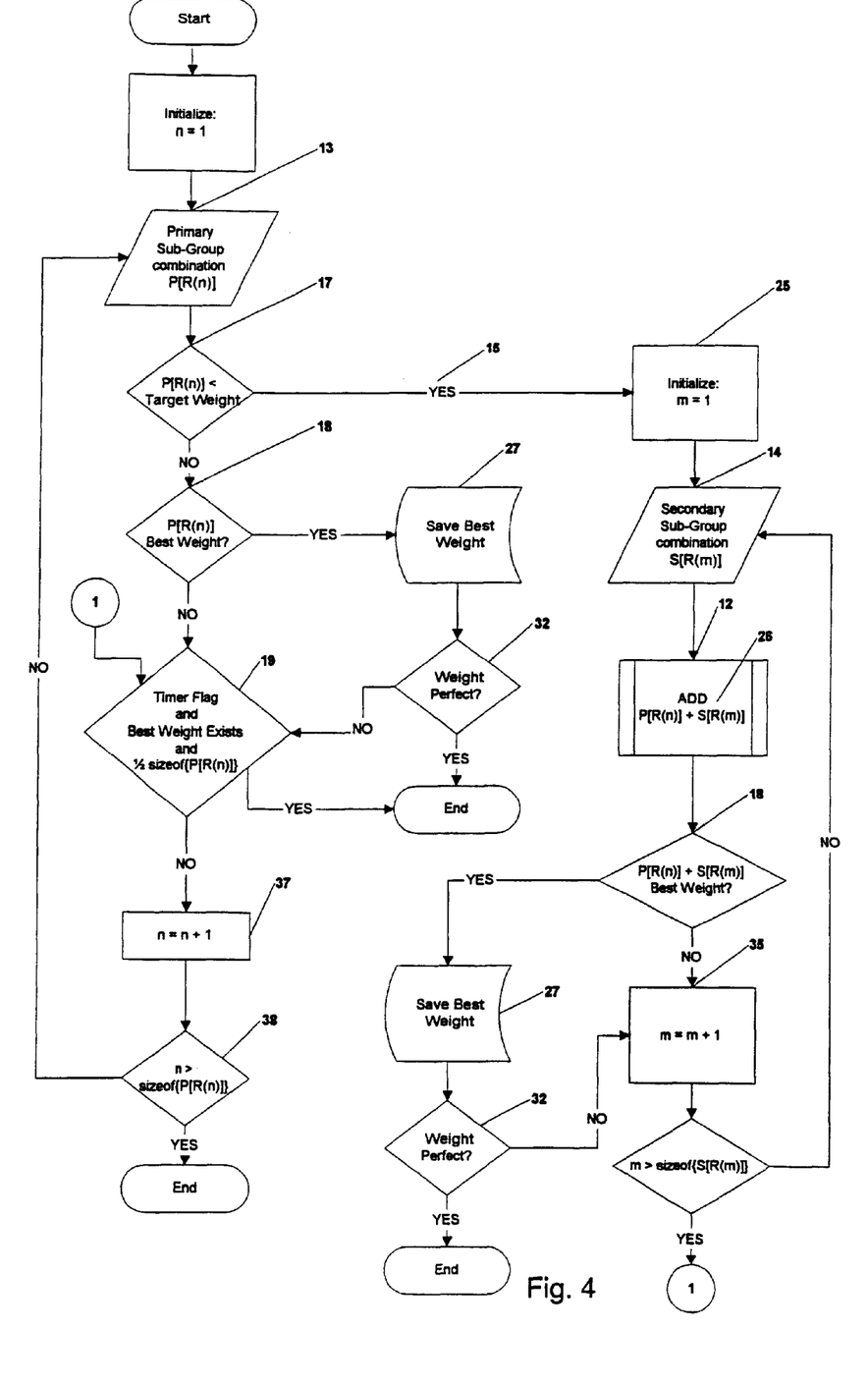
FIG. 4 is a flowchart of the component 15 entitled "Combine Primary P[R(n)] and Secondary S[R(m)] Sub-groups" shown in FIG. 2.

FIG. 4 is a flow chart for the combine primary and secondary sub-group element 15 illustrated in FIG. 2.

The combine primary and secondary sub-group element 15 first selects the highest preference primary group combination from primary group combination 13 and tests it against the limits set by target weight 17. If this weight value is under the target weight range, as tested at 17(which it is not), secondary group is initialized at 25, and the current primary weight is added to rank sequence to the combinations 16b in the secondary group by the secondary sub-group combination 14. The ALU 12 then combines the specific primary group combination 25 with the rank secondary group combination 16b, according to the formula 26, and the best weight memory 18 determines the best weight found thus far within the target values and saves that weight in memory 27. (Note none of the weights in horizontal line 1 in the matrix are within the target range). Formula 26 simply adds the current primary weight $P_{Rn} \rightarrow P[R(n)]$ with the current secondary weight $S_{Rn} \rightarrow S[R(m)]$ where $R_n$ or $R_m$ is the ranked combination.

The save best weight memory 27 stores, in addition to the best current weight, those code numbers associated with that weight in both the primary group and the secondary group. For example, the first best weight 28 of 10.205 oz. in FIG. 3b is stored in 27(FIG. 4). It also stores the secondary group code 30 and the primary group code 31(FIG. 3b) with that combination.

The secondary group code 30, as the primary group codes; i.e., 00100, represents a ranked combination of scale weights in the secondary group with the 0 representing no scale weight, and a 1 representing scale weight and the position of the 0 or 1 in the code representing the scale number beginning from right to left. For example, in the secondary sub-group code 30, reading from right to left with the earliest date scale is in the right-hand column, which in the example given in FIG. 7 is scale number 2, and since it has a 0 designation, it is not included in combination 30. The second ranked scale 3 is also 0, so that it is not included in combination 30; the third ranked scale 6 at 1.902 oz. is included in the calculation because the 1 is in the third position in the code, and the fourth and fifth ranked secondary group scale weights from scales 5 and 8 are also not included. This methodology applies to all the coding combinations described herein.

Next, comparator 32 checks to determine whether the weight is exactly 10.000 oz.(to three decimal places), or whatever the target tolerance might be bearing in mind that the calculation is not carried to a finite value but to a predetermined place. If so, the calculation ends at 33 and the combination is selected. If it is an exact weight carried out to that decimal place, the best combination memory 18(FIG. 2) transfers this combination to the decoder 20, which decodes the values and controls the transfer logic 5 to discharge the appropriate combination of scales.

In the example illustrated in FIG. 3, however, it should be understood that there are no exact values ex-emplified there, so that the calculation by the arithmetic logic unit 12 continues past the primary and secondary group combination 28, even though within the target range.

It should be understood that in the example of FIG. 3, all possible combinations of primary and secondary group combinations are calculated and tested, but the perfect weight function comparator 32 would, if achieved, terminate the sequence at that point, thus conserving sequencing time. More important, the combination found will use the oldest scale weights since all remaining scales will be made up of newer scale weights.

Since primary group combination 11111(10.771 oz.) is over the target range, the best weight 18 will discard it, and no secondary group combination calculation will be made. If, however, the primary group combination is over the target weight but closer to the target weight than the last saved value, it will replace the last saved value in the save best weight(27 in FIG. 4).

Timer flag 19 selects a combination in which the earliest dated weight in the combination has been in the scale over a pre-determined time period. This is, of course, an override to the systemic methodology and prevents excessively old scales, particularly when packaging perishable foodstuffs. It is in effect a fail-safe system.

Since primary combination 11111 is overweight and failed the best weight test 17, these weights are not combined with the secondary sub-group weights 16b, even though these combined values are illustrated in horizontal row 33 in FIG. 3a and FIG. 3b. That is, these calculations, while shown on the chart in FIG. 3, are not actually made in the microprocessor. Next, the combine primary and secondary sub-groups 15 selects the next ranked primary weight combinations 01111 from the primary sub-group combination 13, and since this weighs 8.619 oz., it is less than the target weight 17 test it tests "yes", secondary sub-group is initialized at 25 and the primary sub-group combination is combined with the secondary sub-group combinations in the ranking order illustrated from left to right in FIG. 3a and FIG. 3b in the second horizontal row 34. (Note scale number 1, the latest date stamp scale in the primary group has been eliminated in this combination). Since all of the combined values in horizontal column 34 are above or below the target, best weight comparator 18 discards combinations because they are either above or below the target range. Component 35(m=m+1) repeats the cycling from one secondary combination to another . These discarded values are also tested by the timer flag and best weight exists element 19 determine if one of the scale weights has been previously stored. Component 37(n=n+1), recycles the circuitry to the next primary group rank combination 38, and the cycle repeats itself. The next primary group combination 38, 10111(8.303 oz.) is under the target weight, the secondary sub-group will be initialized at 25 and the primary sub-group combination is combined with the secondary sub-group combinations by the ALU 12 in ranked order until combined weight 10.205 oz. indicated at 28 in FIG. 3b is located, and this weight is saved at memory 27 along with the above-noted primary sub-group and secondary sub-group codes as indicated above, until a weight closer to the target weight is found later in the sequencing. This sequencing continues until primary group combination 01011 is added to secondary group combination 00010 to yield a weight of 9.952 oz.(29 in FIG. 3b), which by being less than target weight does not replace 10.205 oz. indicated at 28 in FIG. 3b, but an acceptable negative best weight memory 27 saves results as best negative weight memory 27. Sequencing continues until primary group combination 10011 is added to secondary group combination 10100 to yield a weight of 10.162 oz.(32 in FIG. 3b), and thus replaces the save best positive weight memory 27. Negative weights are a separate test weight since negative weights increase towards target while positive weights decrease toward target weight.

This sequencing continues until primary group combination 10101(5.863 oz.) is combined by the primary and secondary sub-groups by ranked order 15 with the secondary sub-group combination 00101(4.164 oz.) to yield a combined weight of 10.027 oz. This value replaces the 10.162 weight in the save best weight memory 27. The system continues to search the remaining combinations until primary group combination 10000 is combined with secondary group combination 01111 to yield 9.974 as the best of all possible combinations, it replaces 9.952 in the memory 27 and is selected at the end of all the calculations by best combination memory 18, and these code values are decoded at 20 and utilized to activate the transfer logic circuitry 5 to discharge the corresponding scale chambers in both the primary and secondary sub-groups.

Note: 40*a* is the best positive weight while 40*b* is the best negative weight and best weight overall.

It should be understood that this calculation process is free-running in the sense that it repeats itself immediately upon the termination of a cycle represented by the calculations illustrated in FIG. 3*c*. In this case the selected primary group code is 0001, and the secondary group code is 10101. The primary code 10001 represents scales 9 and 1, and these are the scales, which will be discharged in this cycle, along with secondary group scales compared to 10101 which includes scales 2, 6 and 8. These values are merely picked off FIG. 7.

It should be remembered that A to D conversion 2 runs continuously and updates Raw A to D weights memory 3, so the weight when reading Raw A to D weight memory is the most recent sample of any scale.

The transfer logic circuitry 5 then reloads scales 1, 2, 6, 8 and 9, and their measured weights are transferred from Raw A to D into the analog to digital converter weights memory 3 to the transfer weight array memory 4. Normally, the next calculation cycle would not begin until the discharged scales have been refilled and their weight values entered into the primary and secondary sub-group memories 10 and 11.

Since these five new scale weights will bear a later date stamp than any of the non-discharged scales illustrated in FIG. 7, they will automatically define(in their new ranking order the secondary sub-group shown in FIG. 7 and the primary sub-group will be composed of scales 4, 10, 7, 3 and 5, in that order. In some cases, in order to increase machine speed, it is within the scope of the present invention to continue the calculation sequence prior to refilling the discharged scales. This feature increases machine speed, although with decreasing closeness to target value. This optional feature is expedited in accordance with the present invention by utilizing the ranking combination methodology. The present ranking combination found ranking calculations greatly reduce the number of calculations performed by the combined primary and secondary sub-groups element 15 illustrated in FIG. 2, and this reduction is described in more detail in connection with FIG. 5.

Given the first calculation found a combination using scale 9, since the sub-group size is N=5, the primary group is not required to compute ranked combinations $R_1$ through $R_{16}$, since scale 9 has already been used. This is the result of the ranking sequence, and would also apply to excluding combination from the secondary group.

What is claimed is:

1. A microprocessor scale weight combination selection system for combinational weight machines having multiple scales, having control means for loading and discharging the scales, comprising: means for storing at address positions substantially all the scale weights, means for sorting substantially all the scales according to the time the scales are loaded, means for calculating combinations of the scales giving preference to the time the scales are loaded including means for sorting the combinations of scales according to a formula giving preference to the time the scales are loaded and calculating the combinations giving preference to the sorted order of the scale combinations, and means for selecting from the combinations a combination closest to a target weight, and means responsive to the means for generating a signal to control means for discharging and loading certain of the scales.

2. A microprocessor scale weight combination selection system for combinational weight machines having multiple scales, having control means for loading and discharging the scales, comprising: means for storing at address positions substantially all the scale weights, means for sorting substantially all the scales according to the time the scales are loaded, means for calculating combinations of the scales giving preference to the time the scales are loaded including means for sorting the combinations of scales according to a formula giving preference to the time the scales are loaded and calculating the combinations giving preference to the sorted order of the scale combinations, means for selecting from the combinations a combination closest to a target weight, means responsive to the means for generating a signal to control means for discharging and loading certain of the scales, and means for time stamping each of the scale weights according to the time of scale loading, means for dividing the time stamped scale weights into at least two groups, one group being the earlier time stamped weights and the other being the later time stamped weights, said means for calculating combinations of scale weights including means to add combinations of scale weights in said one group with combinations of scale weights in the other group.

3. A microprocessor scale weight combination selection system for combinational weight machines as defined in claim 2, including means to calculate substantially all combinations of scale weights in said one group and substantially all combinations of scale weights in said other group, said means for calculating combinations of scale weights including means for adding substantially all combinations of scale weights in said one group with substantially all combinations of scale weights in said other group.

4. A microprocessor scale weight combination selection system for combinational weight machines as defined in claim 1, wherein the means for calculating scale weight combinations gives preference to combinations with the greatest number of older scales and the greater number of scales.

5. A microprocessor scale weight combination selection system for combinational weight machines having multiple scales, having control means for loading and discharging the scales, comprising: means for storing at address positions substantially all the scale weights, means for sorting substantially all the scales according to the time the scales are loaded, means for calculating combinations of the scale weights giving preference to the sorting of the scales according to the time the scales are loaded, and means for selecting from the combinations a combination closest to a target weight, and means responsive to the means for generating a signal to control means for discharging and loading certain of the scales, said means for calculating combinations of scale weights including the assignment of a digital code to each combination with the places in the code being representative of the presence or absence of a specific scale weight ranked in the code from right to left or left to right according to time of loading of the associated scale.

6. A microprocessor scale weight combination selection system for combinational weight machines as defined in claim 5, including means for sorting the digital codes and their associated scale weights with a specific formula giving preference to both the oldest scale weights and the greatest number of scales.

7. A microprocessor scale weight combination selection system for combinational weight machines having multiple scales, having control means for loading and discharging the scales, comprising: means for storing at address positions substantially all the scale weights, means for sorting substantially all the scales according to the time the scales are loaded, means for calculating combinations of the scale weights giving preference to the sorting of the scales according to the time the scales are loaded, and means for selecting from the combinations a combination closest to a target weight, and means responsive to the means for generating a signal to control means for discharging and loading certain of the scales, said means for calculating combinations of scale weights including the assignment of a digital code to each combination with the places in the code being representative of the presence or absence of a specific scale weight ranked in the code from right to left or left to right according to time of loading of the associated scale, means for sorting the digital codes and their associated scale weights with a specific formula giving preference to both the oldest scale weights and the greatest number of scales, said formula being:

N=Total number of compartments to participate in subgroup
Where: X are integers with specific range
R is the Ranking Order $$R_1 = 2^N - 1$$
$$R_2 = R_1 - 2^{N-1}$$
$$R_{(x+2^1)} = R_x - 2^{N-2} \quad \text{for } 1 \leq x \leq 2^1$$
$$R_{(x+2^2)} = R_x - 2^{N-3} \quad \text{for } 1 \leq x \leq 2^2$$
$$R_{(x+2^3)} = R_x - 2^{N-4} \quad \text{for } 1 \leq x \leq 2^3$$
$$R_{(x+2^4)} = R_x - 2^{N-5} \quad \text{for } 1 \leq x \leq 2^4$$
$$\vdots$$
$$R_{(x+2^{N-4})} = R_x - 2^3 \quad \text{for } 1 \leq x \leq 2^{N-4}$$
$$R_{(x+2^{N-3})} = R_x - 2^2 \quad \text{for } 1 \leq x \leq 2^{N-3}$$
$$R_{(x+2^{N-2})} = R_x - 2^1 \quad \text{for } 1 \leq x \leq 2^{N-2}$$
$$R_{(x+2^{N-1})} = R_x - 2^0 \quad \text{for } 1 \leq x \leq 2^{N-1}$$

8. A microprocessor scale weight combination selection system for combinational weight machines having multiple scales, having control means for loading and discharging the scales, comprising: means for storing at address positions substantially all the scale weights, means for sorting substantially all the scales according to the time the scales are loaded, means for calculating combinations of the scale weights giving preference to the sorting of the scales according to the time the scales are loaded, and means for selecting from the combinations a combination closest to a target weight, and means responsive to the means for generating a signal to control means for discharging and loading certain of the scales, said means for calculating combinations of scale weights including the assignment of a digital code to each combination with the places in the code being representative of the presence or absence of a specific scale weight ranked in the code from right to left or left to right according to time of loading of the associated scale, means for sorting the digital codes and their associated scale weights with a specific formula giving preference to both the oldest scale weights and the greatest number of scales, means to divide the digital codes into two groups, one group representing the older scale weights and the other the later scale weights, means for sorting the digital codes in each group giving preference to the oldest scales in each group, said means for calculating combinations of scale weights including means for initializing in order of preference the scale weights in said one group with the scale weights in the other group.

9. A microprocessor scale weight combination selection system for combinational weight machines having multiple scales, having control means for loading and discharging the scale weights, comprising: means for storing all scale weights with an associated time stamp, means for sorting the scale weights according to the time stamps, and means for calculating combinations of scale weights giving preference to the scale weights with the earliest time stamps including means for ranking all of the combinations according to a formula favoring the earliest time stamp and the greatest number of machines, and means for selecting from the combinations a combination closest to a target weight, and means responsive to the means for generating a signal to control means for discharging and loading certain of the scales.

10. A microprocessor scale weight combination selection system for combinational weight machines as defined in claim 9, means for dividing the time stamped scale weights into at least two groups, one group being the earliest time stamped weights and the other being the later time stamped weights, said means for calculating combinations of scale weights including means to add combinations of scale weights in said one group with combinations of scale weights in the other group.

11. A microprocessor scale weight combination selection system for combinational weight machines as defined in claim 9, including means to calculate substantially all combinations of scale weights in said one group and substantially all combinations of scale weights in said other group, said means for calculating combinations of scale weights including means for adding substantially all combinations of scale weights in said one group with substantially all combinations of scale weights in said other group.

12. A microprocessor scale weight combination selection system for combinational weight machines as defined in claim 9, wherein the means for calculating scale weight combinations gives preference to combinations with the greatest number of older scales and the greater number of scales.

13. A microprocessor scale weight combination selection system for combinational weight machines as defined in claim 9, said means for calculating combinations of scale weights including the assignment of a digital code to each combination with the places in the code being representative of the presence or absence of a specific scale weight ranked in the code from right to left or left to right according to time of loading of the associated scale.

14. A microprocessor scale weight combination selection system for combinational weight machines as defined in claim 13, including means for sorting the digital codes and their associated scale weights with a specific formula giving preference to both the oldest scale weights and the greatest number of scales.

15. A microprocessor scale weight combination selection system for combinational weight machines as defined in claim 14, including means to divide the digital codes into two groups, one group representing the older scale weights and the other the later scale weights, means for sorting the digital codes in each group giving preference to the oldest scales in each group, said means for calculating combinations of scale weights including means for initializing in order of preference the scale weights in said one group with the scale weights in the other group.

16. A microprocessor scale weight combination selection system for combinational weight machines having multiple scales, having control means for loading and discharging the scale weights, comprising: storing each of the scale weights, calculating all combinations of scale weights and assigning a digital code to each combination with each machine represented by a place in the code, sorting all the digital codes according to a formula giving preference to both the oldest scale weights and the greatest number of scales selected, and means for selecting from the combinations a combination closest to a target weight, and means responsive to the means for generating a signal to control means for discharging and loading certain of the scales.

17. A microprocessor scale weight combination selection system for combinational weight machines as defined in claim 16, including means for time stamping each of the scale weights according to the time of scale loading, means for dividing the date stamped scale weights into at least two groups, one group being the earlier time stamped weights and the other being the later time stamped weights, said means for calculating combinations of scale weights including means to add combinations of scale weights in said one group with combinations of scale weights in the other group, including means to calculate substantially all combinations of scale weights in said one group and substantially all combinations of scale weights in said other group, said means for calculating combinations of scale weights including means for adding substantially all combinations of scale weights in said one group with substantially all combinations of scale weights in said other group.

18. A microprocessor scale weight combination selection system for combinational weight machines as defined in claim 16, said means for calculating combinations of scale weights including the assignment of a digital code to each combination with the places in the code being representative of the presence or absence of a specific scale weight ranked in the code from right to left or left to right according to time of loading of the associated scale.

19. A microprocessor scale weight combination selection system for combinational weight machines as defined in claim 18, including means for sorting the digital codes and their associated scale weights with a specific formula giving preference to both the oldest scale weights and the greatest number of scales, including means to divide the digital codes into two groups, one group representing the older scale weights and the other the later scale weights, means for sorting the digital codes in each group giving preference to the oldest scales in each group, said means for calculating combinations of scale weights including means for initializing in order of preference the scale weights in said one group with the scale weights in the other group.

20. A microprocessor scale weight combination selection system for combinational weight machines having multiple scales, having control means for loading and discharging the scale weights, comprising: means for storing scale weights, means for dividing the scale weights of scales loaded with the same product into a plurality of groups, means for calculating combinations of scale weights in each group, including a first group with those scales having earlier loading times and a second group with scales having later loading times, means for adding a substantial number of combinations of scale weights in one group with combinations of scale weights in another group to produce resulting combinations of scale weights, and means for selecting from the resulting combinations a combination closest to a target weight, and means responsive to the means for generating a signal to control means for discharging and loading certain of the scales.

21. A microprocessor scale weight combination selection system for combinational weight machines having multiple scales, having control means for loading and discharging the scale weights, comprising: means for storing scale weights, means for dividing the scale weights into a plurality of groups, means for calculating combinations of scale weights in each group, means for adding combinations of scale weights in one group with combinations of scale weights in another group to produce resulting combinations of scale weights, means for selecting from the resulting combinations a combination closest to a target weight, means responsive to the means for generating a signal to control means for discharging and loading certain of the scales, means for time stamping each of the scale weights according to the time of scale loading, means for dividing the time stamped scale weights into at least two groups, one group being the earlier time stamped weights and the other being the later time stamped weights, said means for calculating combinations of scale weights including means to add combinations of scale weights in said one group with combinations of scale weights in the other group, including means to calculate substantially all combinations of scale weights in said one group and substantially all combinations of scale weights in said other group, said means for calculating combinations of scale weights including means for adding substantially all combinations of scale weights in said one group with substantially all combinations of scale weights in said other group.

22. A microprocessor scale weight combination selection system for combinational weight machines as defined in claim 20, wherein the means for calculating scale weight combinations gives preference to combinations with the greatest number of older scales and the greater number of scales.

23. A microprocessor scale weight combination selection system for combinational weight machines as defined in claim 20, said means for calculating combinations of scale weights including the assignment of a digital code to each combination with the places in the code being representative of the presence or absence of a specific scale weight ranked in the code from right to left or left to right according to time of loading of the associated scale.

24. A microprocessor scale weight combination selection system for combinational weight machines having multiple scales, having control means for loading and discharging the scale weights, comprising: means for storing scale weights, means for dividing the scale weights into a plurality of groups, means for calculating combinations of scale weights in each group, means for adding combinations of scale weights in one group with combinations of scale weights in another group to produce resulting combinations of scale weights, means for selecting from the resulting combinations a combination closest to a target weight, means responsive to the means for generating a signal to control means for discharging and loading certain of the scales, said means for calculating combinations of scale weights including the assignment of a digital code to each combination with the places in the code being representative of the presence or absence of a specific scale weight ranked in the code from right to left or left to right according to time of loading of the associated scale, including means for sorting the digital codes and their associated scale weights with a specific formula giving preference to both the oldest scale weights and the greatest number of scales, including means to divide the digital codes into two groups, one group representing the older scale weights and the other the later scale weights, means for sorting the digital codes in each group giving preference to the oldest scales in each group, said means for calculating combinations of scale weights including means for initializing in order of preference the scale weights in said one group with the scale weights in the other group.

* * * * *

UNITED STATES PATENT AND TRADEMARK OFFICE
CERTIFICATE OF CORRECTION

PATENT NO. : 6,462,287 B1
DATED : October 8, 2002
INVENTOR(S) : Mikesell

It is certified that error appears in the above-identified patent and that said Letters Patent is hereby corrected as shown below:

Column 4,
Line 7, delete the word "shortest" and insert therefor -- longest --.

Column 5,
Lines 56 and 58, after "at", delete the words "FIG. 7" and insert therefor -- FIG. 5 --.

Column 6,
Line 64, after "in", delete "FIG. 10" and insert therefor -- FIG. 8 --.

Column 11,
Delete lines 38 to 42, beginning with the sentence "The present ranking combination found ranking calculations greatly reduce the number of calculations performed by the combined primary and secondary sub groups element 15 illustrated in FIG. 2, and this reduction is described in more detail in connection with FIG. 5."

Column 13,
Lines 23 to 32, (column 1 of the formula), please correct the formula by deleting "$R_x$" and inserting therefore $R_x$" as follows:

$$R_1 = 2^N - 1$$
$$R_2 = R_1 - 2^{N-1}$$
$$R_{(x+2^1)} = R_x - 2^{N-2} \quad \text{for } 1 \leq x \leq 2^1$$
$$R_{(x+2^2)} = R_x - 2^{N-3} \quad \text{for } 1 \leq x \leq 2^2$$
$$R_{(x+2^3)} = R_x - 2^{N-4} \quad \text{for } 1 \leq x \leq 2^3$$
$$R_{(x+2^4)} = R_x - 2^{N-5} \quad \text{for } 1 \leq x \leq 2^4$$
$$\vdots$$
$$R_{(x+2^{N-4})} = R_x - 2^3 \quad \text{for } 1 \leq x \leq 2^{N-4}$$
$$R_{(x+2^{N-3})} = R_x - 2^2 \quad \text{for } 1 \leq x \leq 2^{N-3}$$
$$R_{(x+2^{N-2})} = R_x - 2^1 \quad \text{for } 1 \leq x \leq 2^{N-2}$$
$$R_{(x+2^{N-1})} = R_x - 2^0 \quad \text{for } 1 \leq x \leq 2^{N-1}$$

Signed and Sealed this

Twenty-third Day of March, 2004

JON W. DUDAS
*Acting Director of the United States Patent and Trademark Office*